(12) United States Patent
Plucknett

(10) Patent No.: US 7,134,237 B2
(45) Date of Patent: Nov. 14, 2006

(54) HUMANE ANIMAL TRAP

(76) Inventor: Bruce Plucknett, 850 NE. Countyline Rd., Sadieville, KY (US) 40370

( * ) Notice: Subject to any disclaimer, the term of this patent is extended or adjusted under 35 U.S.C. 154(b) by 362 days.

(21) Appl. No.: 10/631,691

(22) Filed: Jul. 31, 2003

(65) Prior Publication Data

US 2004/0020103 A1 Feb. 5, 2004

Related U.S. Application Data

(60) Provisional application No. 60/480,992, filed on Jun. 23, 2003.

(51) Int. Cl.
*A01M 23/04* (2006.01)
(52) U.S. Cl. .............................. 43/69; 61/67
(58) Field of Classification Search .............. 43/61, 43/67, 69
See application file for complete search history.

(56) References Cited

U.S. PATENT DOCUMENTS

| | | | |
|---|---|---|---|
| 179,940 A | 7/1876 | Morris | |
| 267,004 A * | 11/1882 | Leese | 43/67 |
| 729,786 A | 6/1903 | McDaniel | |
| 760,738 A | 5/1904 | Huguley | |
| 901,623 A * | 10/1908 | Kolosick | 119/673 |
| 986,977 A | 3/1911 | Harris | |
| 1,102,896 A | 7/1914 | Fischer | |
| 1,108,724 A | 8/1914 | Draper et al. | |
| 1,191,706 A | 7/1916 | Kesler | |
| 1,349,453 A | 8/1920 | Hall | |
| 1,370,084 A * | 3/1921 | Brister | 43/67 |
| 1,516,312 A * | 11/1924 | Scott | 43/69 |
| 1,596,686 A * | 8/1926 | Remington | 43/69 |
| 1,602,677 A | 10/1926 | Jorgensen | |
| 1,680,878 A * | 8/1928 | Elbert | 43/69 |
| 1,792,774 A | 2/1931 | Snider | |
| 1,861,478 A * | 6/1932 | Kleffman | 43/61 |
| 2,217,136 A | 4/1940 | Roff | 43/67 |
| 2,587,349 A | 2/1952 | Mace | 43/76 |
| 2,916,847 A * | 12/1959 | Murphy | 43/61 |
| 3,786,591 A | 1/1974 | Morford | 43/66 |
| 3,931,691 A * | 1/1976 | McCord | 43/61 |
| 4,103,448 A | 8/1978 | Souza | 43/67 |
| 4,151,673 A | 5/1979 | Campbell | 43/67 |
| 5,471,781 A | 12/1995 | Vine | 43/69 |

* cited by examiner

*Primary Examiner*—Kurt Rowan
(74) *Attorney, Agent, or Firm*—Greenlee, Winner & Sullivan, P.C.

(57) ABSTRACT

An animal trap is provided with an enclosure, inside of which a pivoting member, referred to herein as a "Confinement Activating Teeter-totter" (CAT), is pivotally disposed so that its front end pivots downward when an animal enters the trap and steps on it. A blocking member on the front of the CAT then blocks the entrance, forcing the animal to go toward a bait near the exit at the back of the trap. The CAT then pivots under the weight of the mouse, thereby resetting. If, instead of exiting, the animal goes back toward the front, the CAT will again pivot and block the entrance. The animal will also step on a shelf projecting from the front of the pivoting member, ensuring that the CAT will not pivot again until the animal again proceeds toward the exist. The trap is composed of only one moving part (excluding a door flap, and one access part), namely the CAT on its pivot. It is easily molded from plastic such that only two parts are needed: a base and a CAT. After molding a door flap may be attached.

18 Claims, 7 Drawing Sheets

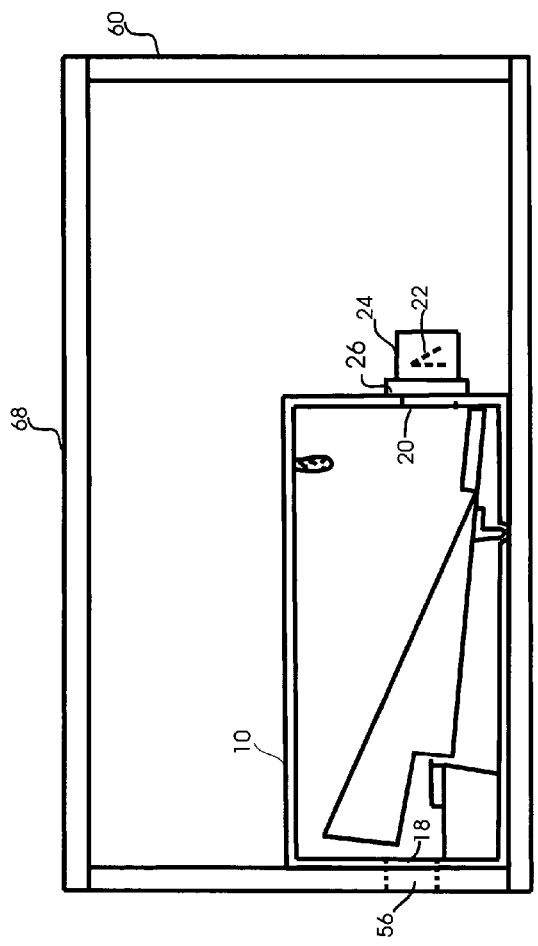
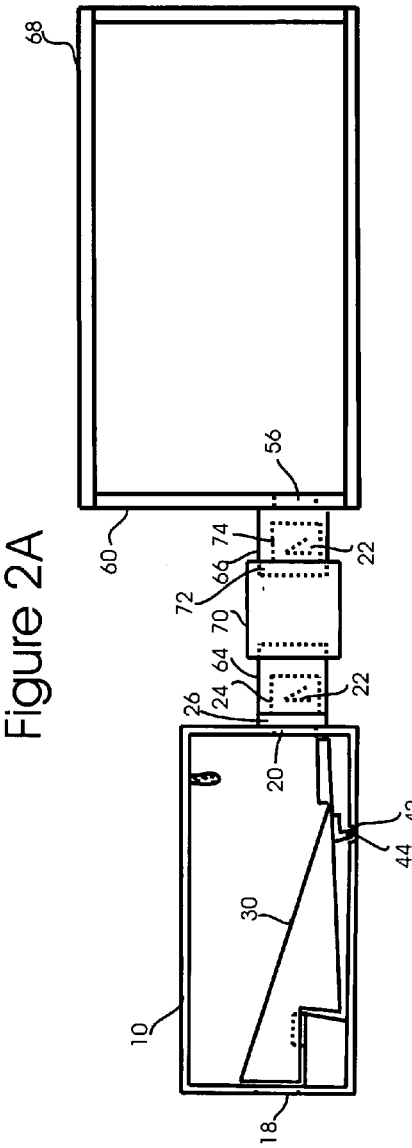
Figure 2A
Figure 2B

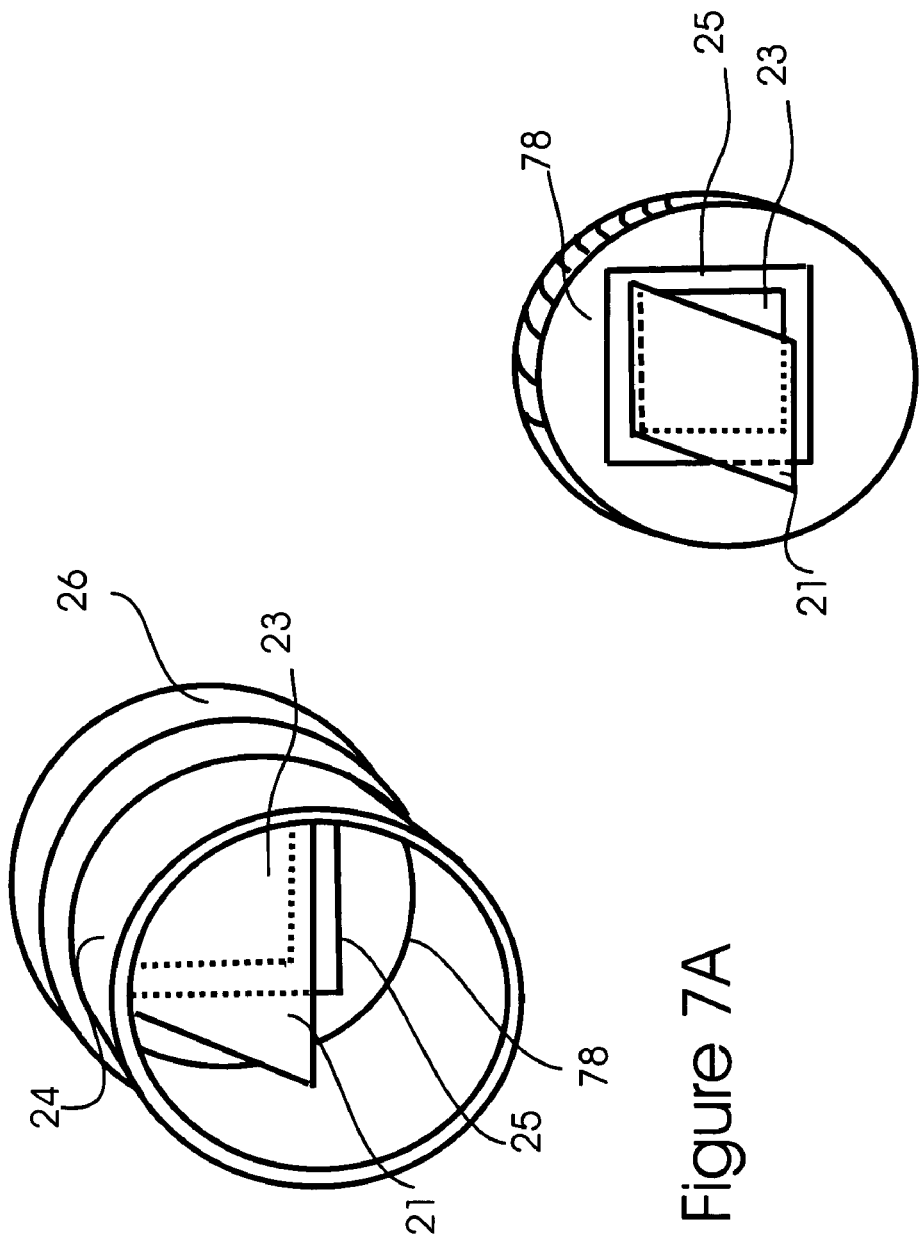

HUMANE ANIMAL TRAP

CROSS-REFERENCE TO RELATED APPLICATIONS

This application claims priority to provisional application No. 60/480,992 filed on Jun. 23, 2003, which is incorporated herein by reference to the extent not inconsistent herewith.

BACKGROUND

From ancient times, humans have hatched clever schemes to catch small animals. Mankind must deal with many pests. To rid our living space of pests, simply and easily, it is our goal to provide a better mousetrap with few moving parts to catch the mouse humanely and keep him whole.

SUMMARY

A useful animal trap is provided which is humane because it allows the mice to live. It can be sized to catch small mice, or rats, or can be larger for larger animals such as rabbits, voles, prairie dogs, hedgehogs or moles. Larger traps can trap a wolf, fox, wild cat, or hooved animal. There are no limits on the size of the trap nor the animal it can trap.

The animal trap of this invention comprises an enclosure, with front and back ends, an entrance hole in the front end, and an exit hole in the back end. The size of these openings must match the size of the animal the trap is to catch.

The enclosure may have no ceiling if its walls are high enough that the animal inside cannot climb out. But it can have a ceiling if the animal might be able to escape through the top. The enclosure of this trap can have any shape desired, such as rectangle, circle, oval or square, polygon, free-form.

Inside the enclosure is a pivoting member, with a front portion adjacent to the enclosure's front end, and a back portion adjacent to enclosure's back end. The pivoting member comprises a beam, which is wide enough and strong enough to support an animal running along upon it. The pivoting member's name is "Confinement Activating Teeter Totter." It is described in more detail hereinafter, and called the "CAT." The pivoting member is pivotally stationed, swings up and down on its axis of rotation. The portion in front of this axis is called "the front portion," and the portion in back of the axis is called "the back portion." The pivoting member's size is such that it extends in the enclosure from the front to the back.

The pivoting member comprises pivoting means, as one skilled in the art will realizes. A shaft can be affixed to the enclosure's side walls and rotationally enclosed within a bore in the pivoting member. The pivoting means can also be a long, wedge-shaped pivot, with one edge resting in a V-shaped groove made in the floor of the enclosure. The pivoting member also comprises a blocking member in front, with a size and shape designed to fairly block off the trap's entrance hole when the pivoting member's front portion is lowered, such that this blocking member is stationed toward or right at the front end of the pivoting member. Preferably the blocking member is a flat upright plate, balanced and weighted so that when it's front is up, the front hole is unblocked. This is the way it rests when the trap is "set," so the animal can easily get inside. When the animal goes onto the pivoting member's front portion, its front pivots down and the entrance closes, and when the animal goes onto its back portion, its front goes back up and the trap then resets.

The exit hole preferably has a door cover that swings only one way so the animal cannot discover a way to get back once he goes through the hole, into the place provided.

A platform can be provided within the trap where the animal can step when he first comes inside.

The pivoting member is equipped with a shelf that runs back from its bottom front, and fits over the front of the platform when the animal's weight has made the front portion lower. The shelf is then even with or below the height of a raised step positioned on the back of the platform. The step's height, with the pivoting member's front raised, is flush with the pivoting member's own floor that extends to the back of the trap to near the exit door. The shelf fits over the platform's front portion; the step is on the back portion.

The pivoting member, between the shelf and the floor, has its bottom cut out so that when it lowers, it can neatly fit over the back of the platform; and the shelf can then cover the platform's front portion, and cannot be lifted by the animal forepaws. The animal cannot reach under it because of the step, and the animal is thus captured.

The pivoting member's side walls are higher beside its floor than by its shelf.

An exit step preferably is positioned on the back of the pivoting member to aid any animal in its transition through the exit hole when the pivoting member's back is down. Another purpose of the step as one skilled in the art will understand is so that the trap will stay set when the animal leaves.

If a second animal enters the trap while one is still inside, the exit step raises, carrying the first animal with it, but the first animal can still exit; the back hole is open.

There is bait in the trap, which can be on a ceiling, secured to the ceiling with securing means. Preferably the animal cannot reach the bait, and so gives up and proceeds out of the exit. As one skilled in the art will understand, the bait can be any food, such as meat or cheese, and can be secured to the ceiling by any known means, e.g., an L-shelf, clip, hook, or other devices that depend from the ceiling. If there is no ceiling, the securing means may be on a wall. Preferably, the bait is placed near the trap's back to attract the animal toward the back.

The animal steps on the platform beneath the entrance, and then to the platform step, and on to the pivoting member's floor, causing the front of the pivoting member to lower and block off the entrance. The animal must then proceed toward the bait. He crosses the rotational axis and then his weight on the pivoting member's back end makes it fall. He goes onward to the exit step and steps on it, where he is confronted with the exit hole, from whence he goes through to a cage where he remains trapped.

The cage can surround the trap's enclosure. From the cage, the animal may go on to disposal. Or the cage can be placed close to the trap, connected securely by a closed conduit such as a sleeve positioned on the trap's outside wall, so as to transition the animal out the trap, into the sleeve, and through a one-way door in the sleeve which allows him to leave, but not return. This sleeve (connector) leads to a cage, called herein a "containment sector."

The animal can now be released, or killed or used, e.g., sold or turned into a pet. The sleeve for example, can lead to a slide, where the animal, with nothing to grab, slides down, into a water tank where he drowns. Or the cage can be a place for keeping a pet snake who can eat all the mice that are trapped.

The trap's enclosure requires means for access for putting in bait or for cleaning. If the trap lacks a ceiling, its open top can serve as an access means. Or grooves in the walls near the top can permit a lid to slide in and out; or one could fit hinges to the top of the wall attached to the lid so that the lid can be closed. Alternatively, the ceiling or lid can be made with a door that can open by known opening means, e.g., hinges or grooves. Or the lid can simply lift off. The access means can be in the bottom or sides or anywhere.

In a preferred embodiment, the trap has only one moving part (other than an exit or access door). This one moving part is the pivoting member.

The trap can be scaled to accommodate the target animal's size and weight.

The method of trapping an animal comprises: providing the trap as described above; placing bait that the animal likes in the setting the trap so that the entrance is open, and waiting. With the front of the pivoting member raised, it won't block the entrance, and the animal is allowed to enter, in pursuit of the bait, and proceeding, to place all its weight on the front floor of the pivoting member so that the front blocking member now covers the entrance hole so that he cannot get out. If the animal cannot reach the bait then he won't want to stay, and is allowed to travel back through the exit, thereby resetting the trap, so it will not have to be done manually in order to catch the next animal. Outside the exit door, a cage or container can be placed to keep the animal.

The trap can be made out of metal, wood, plastic or any other material. Preferably it is made of molded plastic, preferably with all parts possible molded together, except for a removable ceiling. The trap base, including the floor with its groove, can be formed as a single piece with the rest of the elements of the trap: the platform and platform step; and preferably, the walls and exit sleeve are also molded with that one single piece. Part of the ceiling can also be molded with that single piece. A hole should be left in the ceiling for taking things in and out.

The pivoting member and its side walls, shelf and floor with cutout, step and pivot should also be molded as one piece, for economical construction. Of course, the parts can be made separately as well, and attached together, e.g., with glue or with welding or pins or other means known to the art for assembling parts.

Preferably when the enclosure has been made with a ceiling that opens up, whether laid on the top or hinged, the ceiling can be opened and the pivoting member set inside with its front blocking member placed at the front end, and its pivot in the groove, so it tends to balance inside the enclosure with its front portion raised so the entrance is open. The pivoting member should be weighted so that it is prepared for the animal who has stopped on its front portion to make the front portion go down, closing the entrance so that he cannot get out and will be routed as desired.

The trap can be provided with extra connectors, pipes and one-way door assemblies to route the animal onward and around. The invention includes such parts as a kit, comprising one-way doors and pipes of different lengths to fit on the trap. The kit can also include a cage, bait and pipe fittings as well.

BRIEF DESCRIPTION OF THE FIGURES

FIG. 2A: provides a cross-section side view of the mousetrap enclosed in a cage where mice can be kept.

FIG. 2B: provides a cross-section side view of the trap outside the cage, in mouse-tight connection therewith.

FIG. 7 provides a view of the one-way door assembly. FIG. 7A shows the sleeve, attached to the trap at the exit. Inside the sleeve, the door flap can be seen. FIG. 7B shows the door portion removed from the sleeve so the mouse can leave.

DETAILED DESCRIPTION

Figures 1A, 1B:
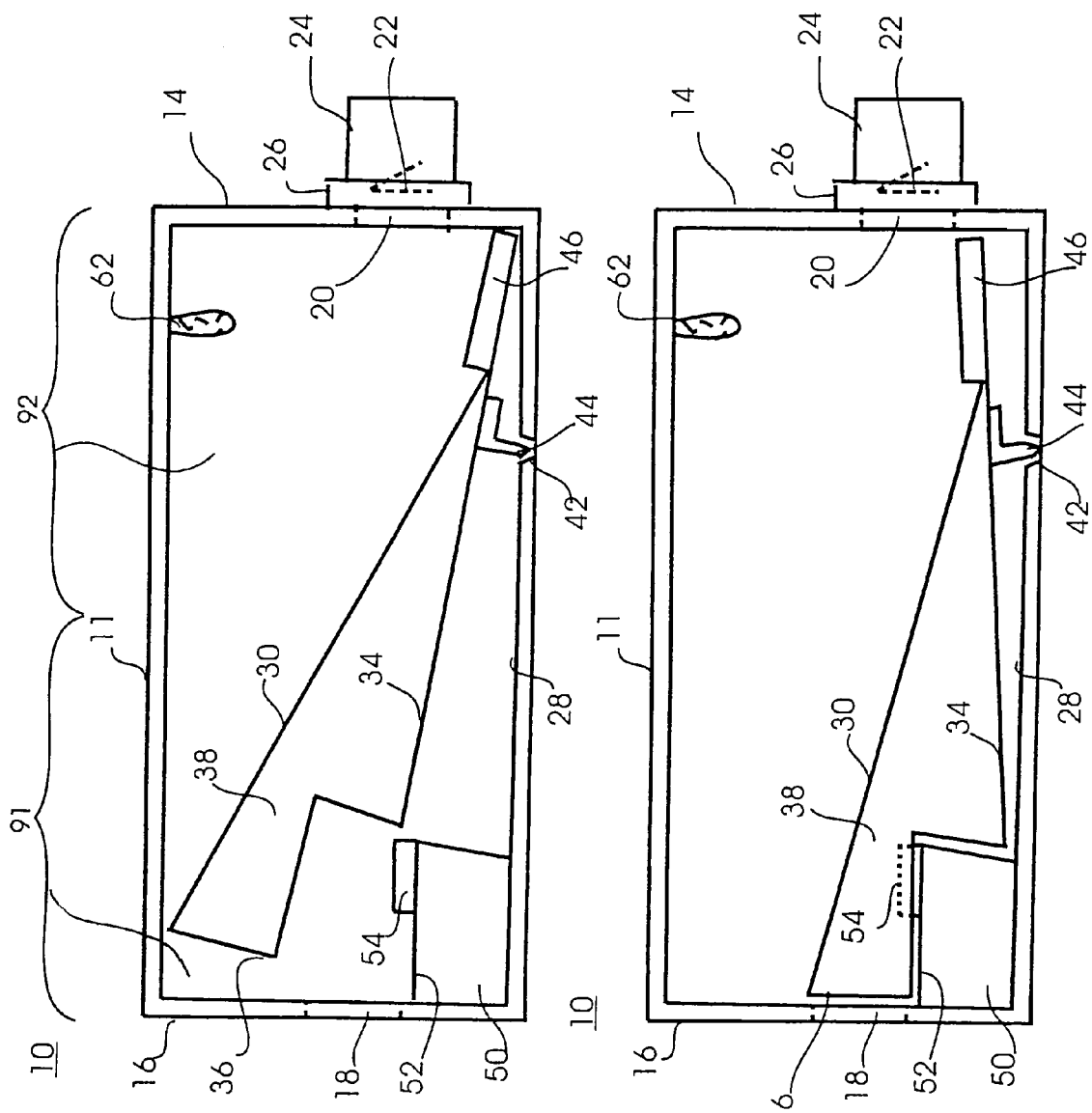
FIG. 1A shows a cross-section side view of the mousetrap. The CAT is raised in front, allowing a mouse get inside the trap.
FIG. 1B shows the same trap with the front of the CAT front down, as when the mouse has entered.

FIG. 1, shows a cross-sectional side view mousetrap 10, comprising back wall 14, exit hole 20, front wall 16, entrance opening 18, front end 91 and back end 92. The trap is equipped with a floor 28 and ceiling 11 from which the bait 62 hangs. Preferably, the ceiling is absent, or opened by sliding on grooved walls or fastened with hinges or such opening means to allow access to the inside of the trap.

Exit sleeve 24 is attached to the outer wall, matched to the exit so that the exit hole leads into the sleeve of the one-way door assembly, allowing the mouse to exit the trap. The exit sleeve 24 can have lip 26, by which it can stick to the outer wall by means known to the art, such as molding, gluing, clipping, nailing, screwing or other means. One way door 22 is disposed in the sleeve.

CAT 30 is disposed inside trap 10 with its front down, in set position as shown in FIG. 1A, so the entrance is blocked by CAT front wall 36. The CAT comprises side walls 38 and floor 34. The mouse must climb onto exit step 46 to go out.

Pivot 44 is placed on the bottom of floor 34, resting in groove 42 in trap floor 28, whereby the CAT rocks on the pivot under the mouse's weight.

Within the trap, by the entrance, is platform 50 with its floor 52. On the back end of platform 50 is platform step 54, which leads the mouse to step on the CAT floor.

To use the trap, ceiling 11 is opened or taken off, and bait 62 is placed on the shelf, or attached by means such as hooks, clamps, or other means known to the art, out of mouse reach. The trap is then set and closed. When CAT 30 is raised in the front as in FIG. 1A, trap 10 will be set.

Bait 62 smells good and entices the mouse into trap 10 through entrance 18, where it steps on platform 50, and climbs step 54, drawn on by the bait, to CAT floor 34.

The CAT front pivots down on pivot 44 set in groove 42 in the trap floor 28. CAT front wall 36 now comes down to block entrance 18, so the mouse must go on toward bait 62 on CAT floor 34 until the CAT, beneath its weight, pivots downward again, as shown in FIG. 1. The trap is now reset to allow a new mouse to be caught.

The mouse then climbs on exit step 46 toward the bait, but unable to reach it, he continues out through exit hole 20. He then passes through one-way door 22 in exit sleeve 24 and cannot re-enter the trap.

As shown in FIG. 2A, trap 10 is disposed In cage 60, where the mouse can be captured. Cage entrance 56 is aligned with trap entrance 18 so that a mouse coming in through both entrances then out through exit 20, and door 22, will pass out of trap 10 to cage 60 where all the mice caught in the trap can be collected. Cage top 68 opens up to allow retrieval of the mice for release, or other disposal.

FIG. 2B shows, in cross-sectional side view, trap 10 in mouse-tight connection with cage 60. Entrance sleeve 74 is affixed to the cage at cage entrance 56. Conduit 66 is slipped against entrance sleeve lip 76 and a similar conduit 64, next to exit lip 26. The conduits are joined with connector sleeve 70. There can be many connectors. Standard PVC pipe can be used to construct channels and pathways through which the mice can be conducted. 1.5 inch pipes can be used for the sleeves to fit in, butting up to the lips, with connectors to join the pipes as desired to route the mice, for example for amusement. One-way door assemblies are also provided for this maze, having exit sleeves, lips, and one-way doors the right size.

As shown in FIG. 2B, The mouse goes in the entrances, thence out the exit, through the one-way door, and into the cage.

Figure 3:
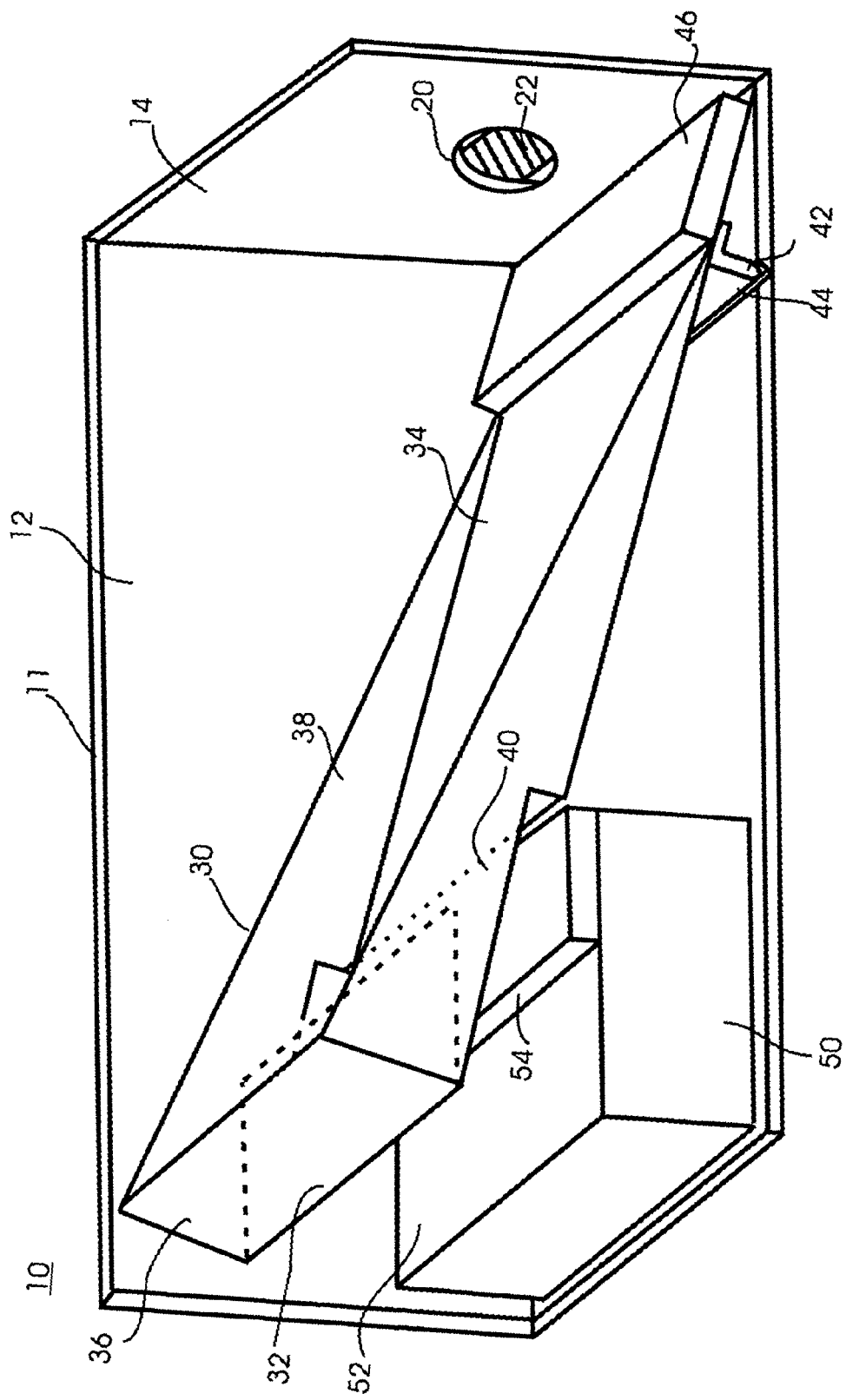
FIG. 3 provides a front in perspective view of the trap with the top, front and side walls removed to show the platform, CAT, pivot, and grooved floor.

FIG. 3, in perspective, depicts trap 10 with front and side walls removed to show CAT shelf 32 and cut-out 40 in CAT floor 34 that fits over platform 52 when the CAT front goes down. When the mouse enters trap 10 and proceeds to step on platform 52, and then to step down on step 54, which is flush with floor 34, its weight makes CAT 30 rotate its front down so that shelf 32 rests over platform floor 52. Now if the mouse tries to turn back he will have to step down on the shelf and his weight will not allow the CAT front to rise. As in FIG. 1B the CAT front comprises CAT front wall 16, which now effectively blocks the entrance and locks the mouse inside.

Figure 4:
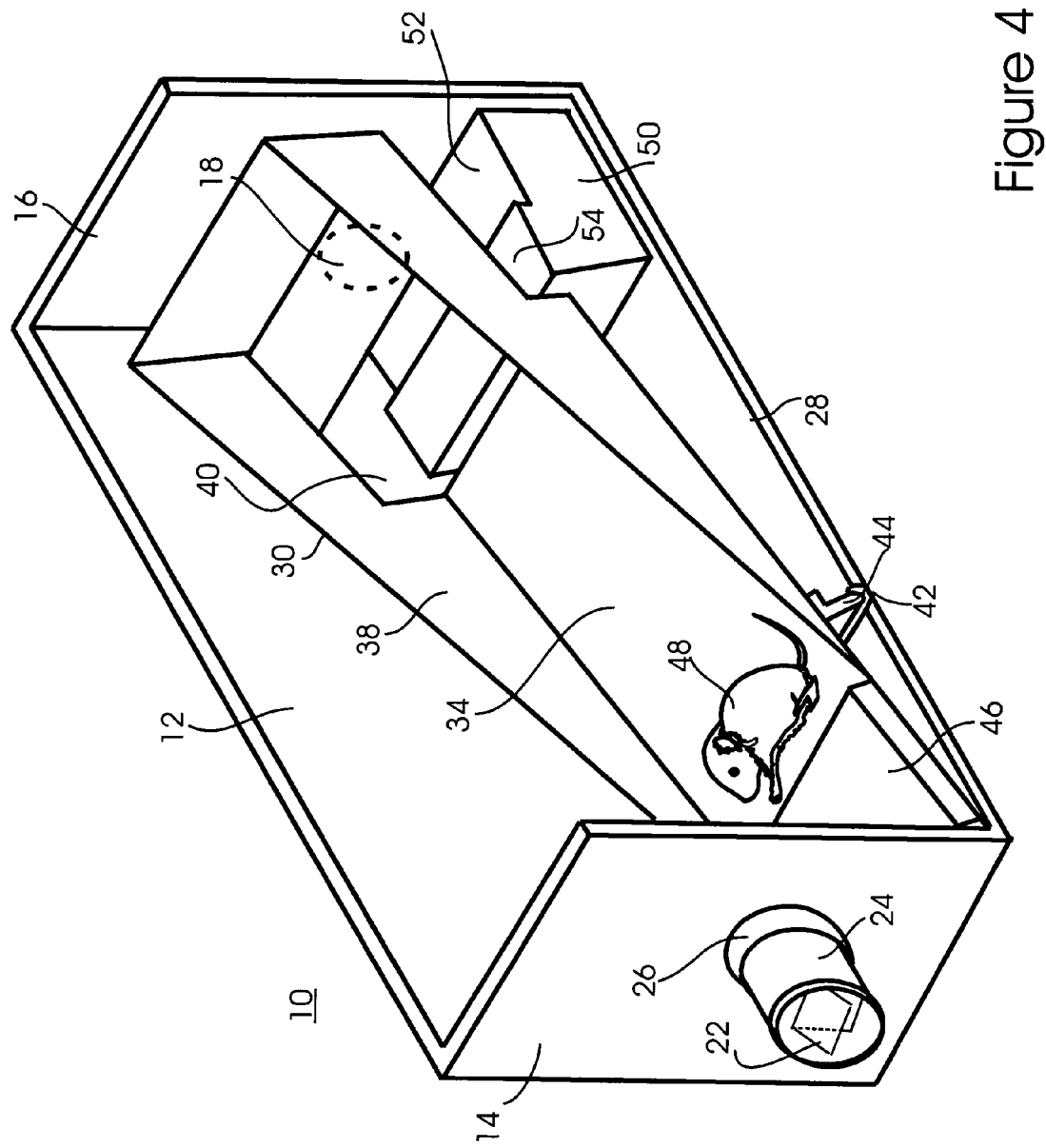
FIG. 4 provides a back perspective view of the trap with the top and sides removed and a mouse inside on the CAT near the exit; so that the CAT's front end is raised and the entrance is open.

FIG. 4 shows, in perspective from the exit side, trap 10 without one side wall. Exit sleeve 24, lip 26, one-way door 22, and exit step 46 are visible.

Mouse 48 inside the trap, goes down the slope of CAT floor 34, and steps on step 46, then exits one-way door 22.

Figure 5:
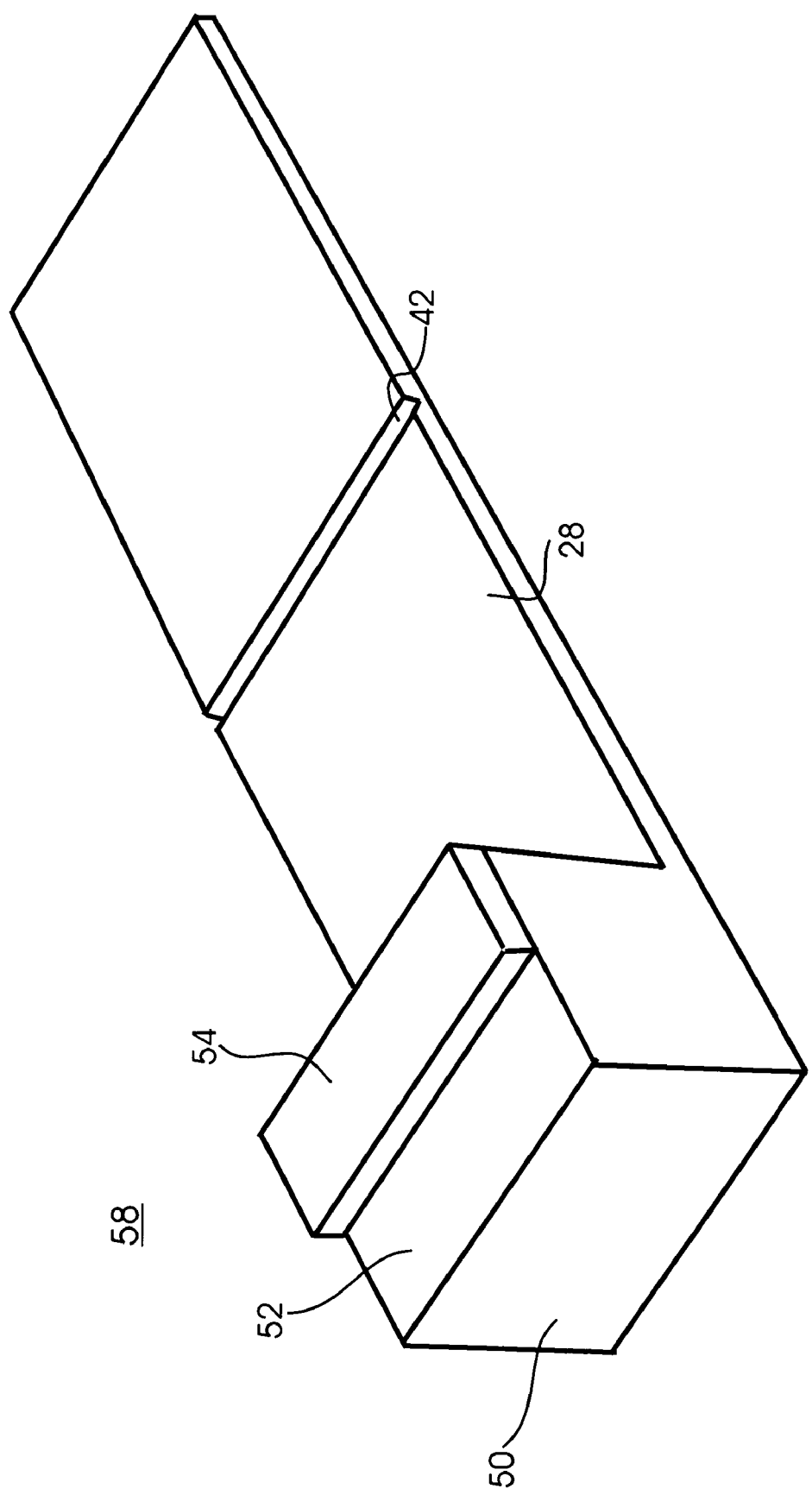
FIG. 5 provides a perspective view of the base of the trap.

FIG. 5, in perspective, shows base 58 with groove 42 in its floor 28. CAT pivot edge 44) FIG. 4) rotates in this groove. FIG. 5 also shows platform floor 52 and platform step 54 on platform 50.

Molded as one piece, the trap of this invention is simple, effective and good.

Figure 6:
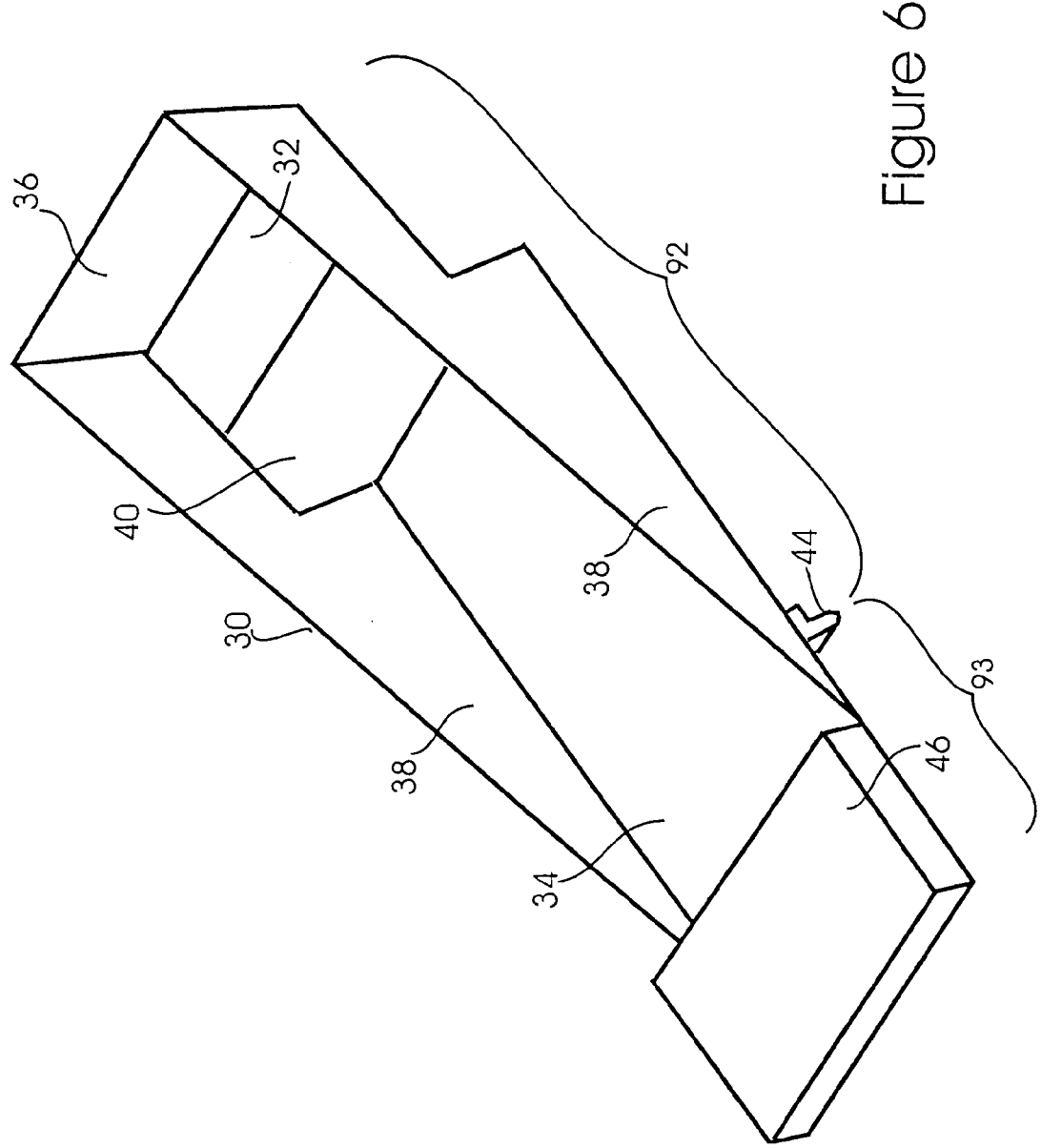
FIG. 6 provides a perspective view of the CAT.

FIG. 6, in perspective, shows CAT 30 by itself, comprising shelf 32, floor 34, front wall 36 and side walls 38. The CAT also comprises front portion 93 in front of the pivot and back portion 94 in back of the pivot. Cut-out 40 in floor 34 fits over the platform. CAT pivot 44 rotates in the groove in the trap floor.

The CAT is designed to be molded as one piece combined with the pivot.

FIG. 7 is a perspective view of the one-way door assembly. FIG. 7A shows exit sleeve 24 with optional lip 26; and inside it, door piece 78 comprising the one-way door. The door piece comprises an opening 23, covered by flap 21. The opening is recessed in door frame 25 so that when the mouse has gone through it, he cannot get his paws in beneath the door flap, and cannot reenter the trap. Door piece 78 is shown in FIG. 7B, comprising door frame 25 with its flap 21, and its opening 23 somewhat recessed back into the door frame. Preferably flap 21 is a bit larger than opening 23 so it won't fit back in through from the outside. The flap is applied to the door frame by any means known to the art, such as glues, welds, pins or adhesives. The door frame can be one single part with the sleeve, or it can be separate, and the sleeve can have a furrow or groove carved inside wherein a round edge on the frame will fit in and stay.

The exit sleeve and all it comprises can affixed to the trap centered on the exit opening by appropriate means including pins, welds, glues, and adhesives. want it. However, preferably the trap and sleeve are molded as one piece out of plastic or metal. Lip 26 may not be needed if the sleeve can be made to fit tight on the trap.

In one embodiment of the trap, the door assembly (without the flap) is molded as one part to fit in a standard, 1.5-inch diameter PVC pipe. The outside of the sleeve is designed to fit snugly into the pipe. Then the flap is added as a separate piece.

The trap can comprise only four separate pieces: base, CAT, door flap, and ceiling access.

The invention has shown in specific embodiments, leaving out many embellishments. Equivalent elements can be used. One skilled in the art can choose from a wide range of such equivalent elements, and all such variants shall fairly fall within the scope of the appended claims.

The invention claimed is:

1. An animal trap comprising:
   an enclosure having a front end with an entrance opening; and a back end with an exit opening;
   a floor with a groove for receiving a pivot;
   a pivoting member pivotally mounted within said enclosure and having a front portion adjacent said front end, said pivoting member extending to said back end, and having a back portion; said pivoting member comprising:
   a pivot extending from the underside thereof, adapted to be pivotally mounted in said groove;
   a blocking member that effects closure of said entrance opening when said front portion of said pivoting member is lowered;
   said pivoting member being balanced such that when it is at rest the trap is set with the front portion of the pivoting member raised; and
   wherein, when an animal's weight is put upon said front portion of said pivoting member, said front portion will lower, causing said blocking member to block said entrance.

2. The trap of claim 1 which further comprises:
   a one-way door at said exit opening.

3. The trap of claim 1 further comprising:
   a platform within said enclosure sized to accommodate an animal stepping on it when the animal enters the trap, said platform having front and back portions.

4. The animal trap of claim 3 wherein said pivoting member comprises a floor with a cut-out sized to fit around the back portion of said platform.

5. The animal trap of claim 3 wherein said pivoting member comprises a shelf upon its front portion sized to fit above said front portion of said platform.

6. The trap of claim 5 wherein the back portion of said platform comprises a platform step having a height proportioned to be flush with said shelf or higher than said shelf when the front portion of the pivoting member is lowered, and to be flush with the floor of the pivoting member when the front portion of the pivoting member is raised.

7. The animal trap of claim 1, further comprising:
   an exit step on the back portion of the pivoting member, close to the exit opening, to aid in the animal's leaving the trap.

8. The trap of claim 1 enclosed within a cage.

9. The trap of claim 1 further comprising a conduit having one end engaged with the exit opening and the other end engaged with the entrance of a cage.

10. The animal trap of claim 1 further comprising an exit sleeve positioned at the exit opening.

11. The animal trap of claim 10 further comprising a one-way door that opens outward within said sleeve.

12. The trap of claim 1 having only one moving part exclusive of doors for exit and access, said one moving part being said pivoting member.

13. The animal trap of claim 1 sized and balanced to trap rats or mice.

14. A mousetrap comprising:
an enclosure having a front and back end and a ceiling;
means for attaching a bait near said ceiling out of reach of a mouse within said enclosure and closer to the back than the front of said enclosure, bait having a smell designed to lure said mouse;
an entrance opening at said front end;
an exit opening at said back end;
a one-way door at said exit opening to allow said mouse to exit the trap and not be able to return;
a platform having a front and back portion within the enclosure, placed and sized such that when said mouse first enters the trap through said entrance opening, it must step on the platform;
a step on the back portion of said platform such that said mouse must step from said platform onto said step;
a pivoting member extending from said front end to said back end within said enclosure, said pivoting member portions, and being pivotally mounted on the floor of said trap;
a pivot on the underside of said pivoting member on which the pivoting member can pivot;
said pivoting member having a cut-out that fits over said platform step when the front portion of the pivoting member is lowered;
said pivoting member further comprising a shelf designed to fit over the front of said platform when the front portion of the pivoting member is lowered;
said pivoting member also comprising a blocking member on the front portion thereof designed to block the entrance when the front portion of the pivoting member is lowered;
an exit step on the back portion of said pivoting member;
said pivoting member being balanced and weighted such that it pivots smoothly and such that when there is nothing on it, its front end is raised, and such that a mouse's weight causes it to pivot such that when the mouse travels on said pivoting member toward the exit, the back portion of the pivoting member lowers, thereby resetting the trap.

15. A method for trapping an animal comprising:
providing a trap of claim 1;
placing a bait in the trap;
making sure the trap is set with the front portion of the pivoting member raised above the point where blocking member would block the entrance opening; and
providing a receptacle outside the exit door to receive an animal exiting the trap.

16. The method of claim 15 also comprising releasing a trapped animal.

17. The method of claim 15 comprising providing a shelf on the bottom front portion of the pivoting member to prevent the animal from exiting the trap through the entrance.

18. A method of making an animal trap comprising:
providing an enclosure having a floor with a groove, a front end with an entrance opening, and a back end with an exit opening;
providing a pivoting member that fits within the enclosure, said pivoting member having a front and back portion;
said pivoting member also having a blocking member on the front end thereof that is capable of blocking the entrance opening, and said pivoting member further having a pivot on its underside on which said pivoting member can rock; and
placing and balancing said pivot in said groove such that the front portion of said pivoting member is raised, and an animal's weight on said front portion of said pivoting member will cause the front portion to lower, whereby the entrance to the trap is blocked.

* * * * *